May 30, 1939.  H. V. DUNN  2,160,327
MACHINE FOR NOTCHING AND BENDING PIPES
Original Filed May 17, 1937  3 Sheets-Sheet 1
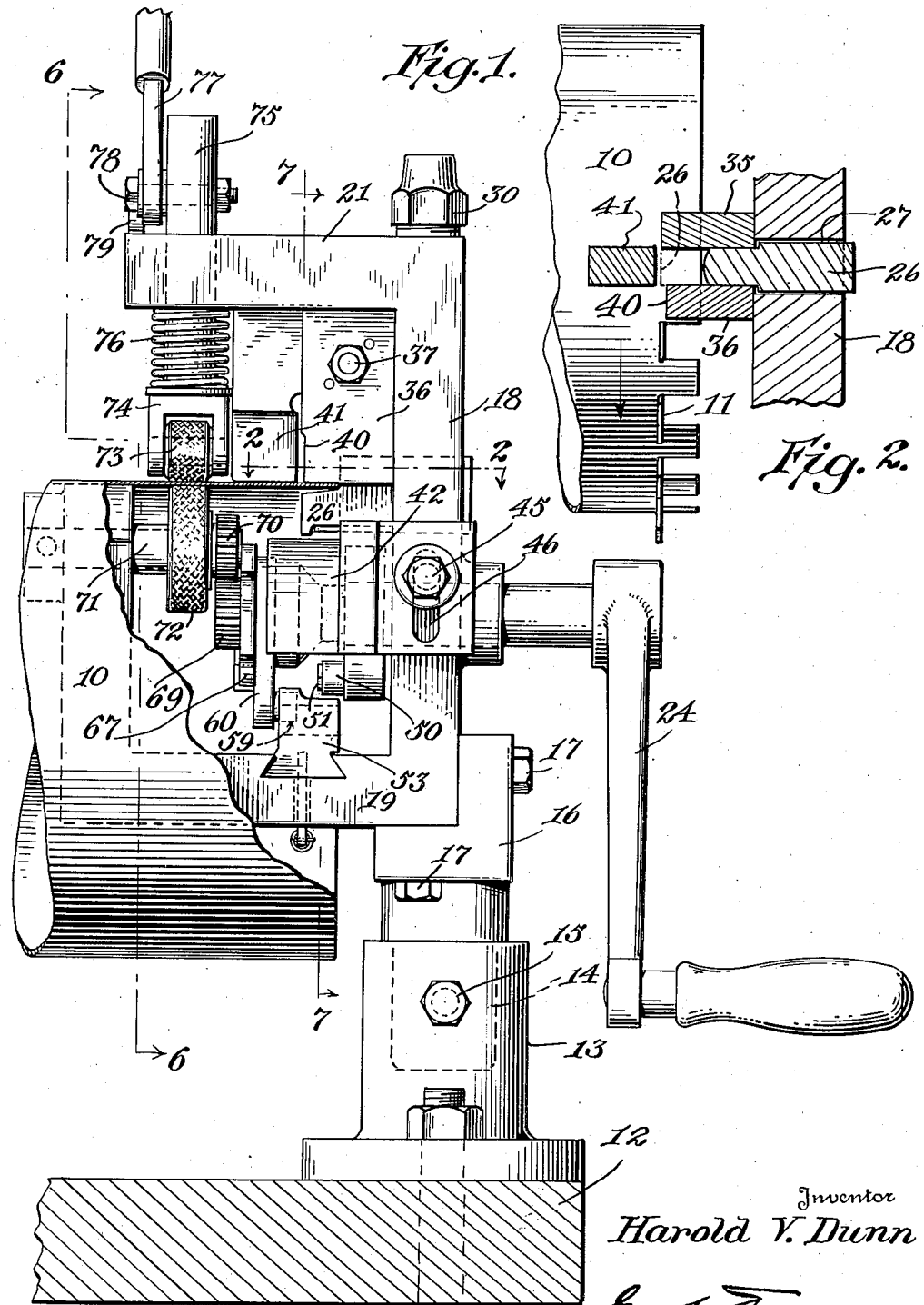
Inventor
Harold V. Dunn
By Geo. E. Tew
Geo. A. Tew  Attorneys May 30, 1939.  H. V. DUNN  2,160,327
MACHINE FOR NOTCHING AND BENDING PIPES
Original Filed May 17, 1937  3 Sheets-Sheet 2
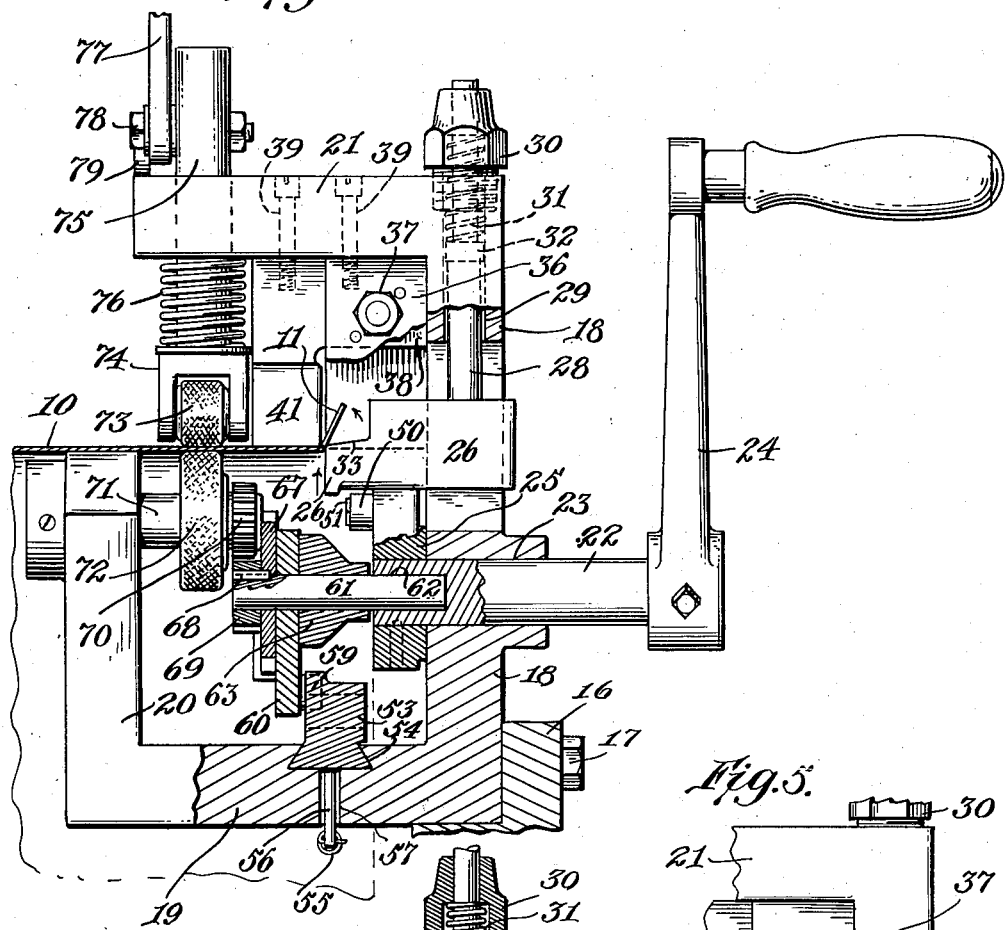
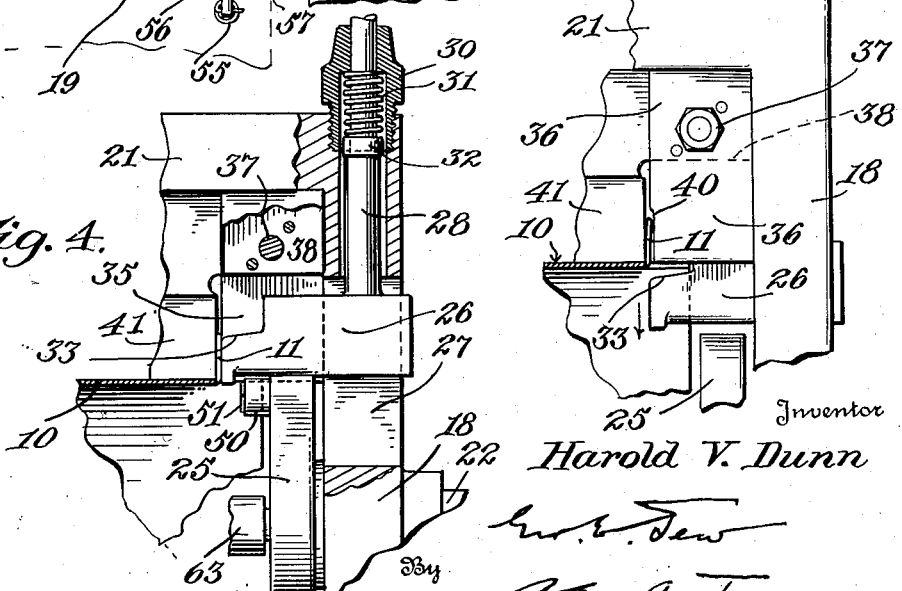
Inventor
Harold V. Dunn

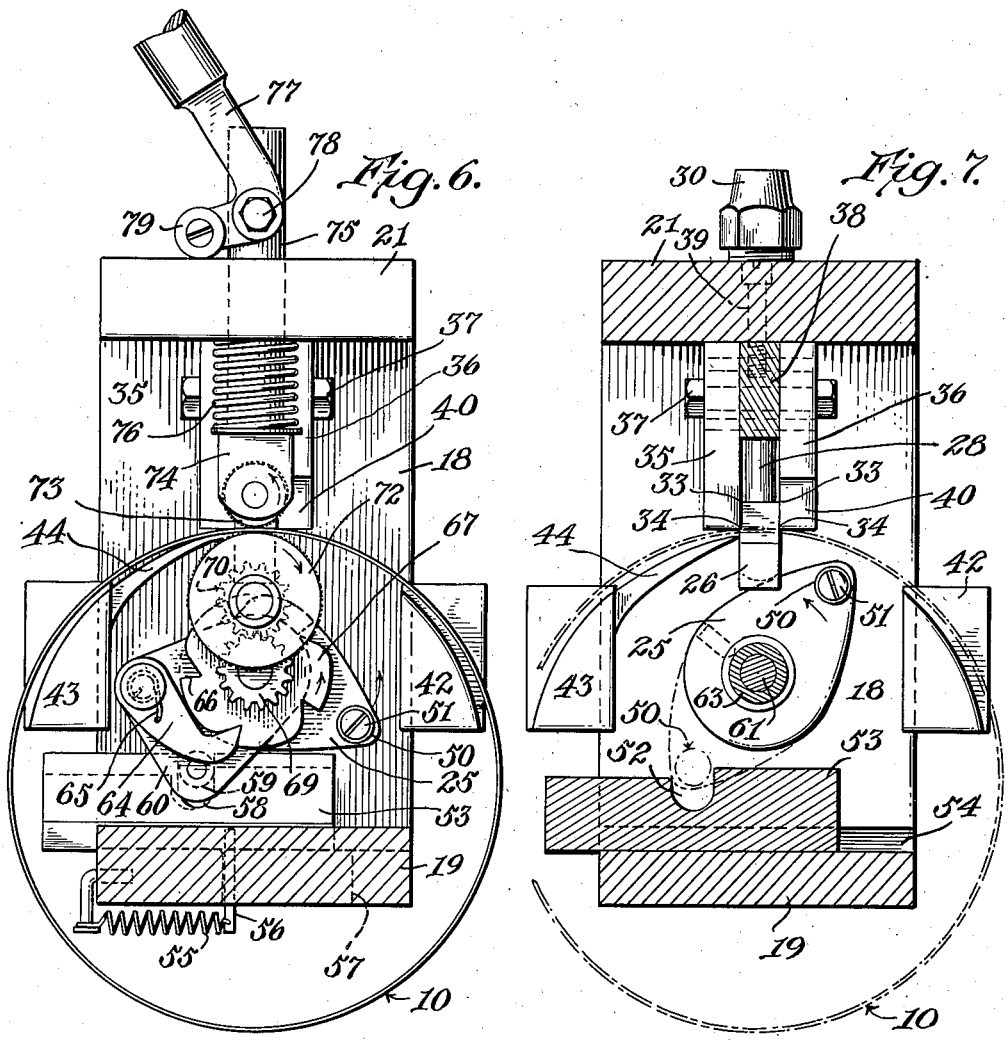
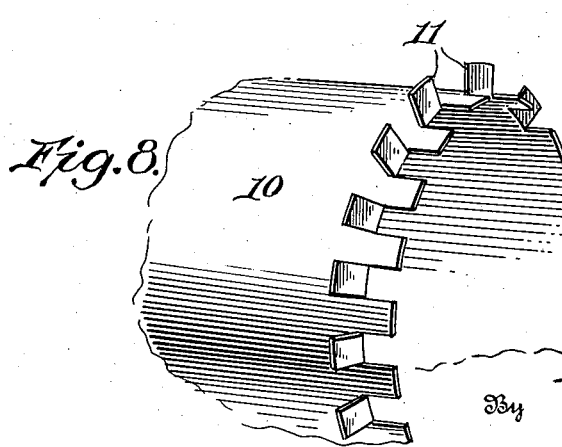

Patented May 30, 1939

2,160,327

UNITED STATES PATENT OFFICE 2,160,327

MACHINE FOR NOTCHING AND BENDING PIPES

Harold Vincent Dunn, Olean, N. Y.

Application May 17, 1937, Serial No. 143,156
Renewed September 26, 1938

15 Claims. (Cl. 153—2)

This invention is a machine for notching and bending the ends of pipes, especially sheet metal pipes such as are used for flues, air ducts and the like.

In connecting a sheet metal pipe to an opening in a plate for example, it is customary to cut tongues around the end of the pipe and bend them outwardly and then fit the standing end of the pipe in the hole in the plate with the tongues abutting the plate around the hole, and then soldered or otherwise firmly attached in position.

So far as I know this work has always been done by hand, the tongues being cut by a pair of tinners' snips and then bent out by a suitable tool. This is slow and irregular.

The object of the present invention is to provide a machine for doing this and similar work, and the machine comprises means for die cutting or slitting the end of the pipe to form the tongues and then automatically bending the tongues outwardly at a right angle to the axis of the pipe. The pipe is placed in the machine and by the operation of a crank the tongues are cut and bent in succession, the pipe being revolved or fed around and indexed for successive operations until the whole end, or as much thereof as may be desired, is notched and tongued.

The invention may be embodied in various forms. One form is shown in the accompanying drawings in which Fig. 1 is a front elevation of the machine; Fig. 2 is a section on the line 2—2 of Fig. 1; Fig. 3 is a front elevation partly in section showing the parts in a different position from Fig. 1; Fig. 4 is a detail in elevation showing the position of the die at the completion of a bending operation; Fig. 5 is a similar view showing the die retracting; Fig. 6 is a section on the line 6—6 of Fig. 1; Fig. 7 is a section on the line 7—7 of Fig. 1; and Fig. 8 is a perspective showing the work done by the machine.

Referring particularly to Fig. 8, 10 indicates a pipe end in which tongues 11 are cut and bent outwardly in position to fit around the edge of a hole in a plate or the like to which the pipe is to be connected. By the machine to be described these tongues are cut, bent and spaced apart at equal distances around the end of the pipe.

The machine is shown mounted on a bench or other support 12 by means of a socket 13 bolted to the bench and a stud 14 fitting in the socket and held by a screw 15. This permits the machine to be turned or adjusted to any angle convenient for the operator. The stud 14 projects from a heavy angle bracket 16 bolted as indicated at 17 to the frame of the machine.

The frame may comprise an angular casting or the like having a vertical wall 18, a bottom part 19, an opposite partial vertical wall 20 and a top plate or part 21, provided with suitable guides and bearings to support the parts to be described.

A shaft 22 extends through a bearing at 23 in the side wall 18 and is provided with a crank handle 24 by which it may be turned. At its inner end the shaft has fixed thereto a cam 25 which wipes against the under side of a reciprocating cutting and bending die 26 the shank of which moves up and down in a guide slot 27 in the wall 18 and is provided with a rod or plunger 28 which works in a bore 29 formed in the wall 18 and working through a bushing 30 at the top. This bushing confines a spring 31 coiled around the rod and bearing downwardly against a collar or shoulder 32 on the rod, thereby returning the movable die downwardly after it is lifted by the cam.

The die 26 has a pair of cutting edges 33 which cooperate with cutting edges 34 at the lower end of a fixed or female die consisting as shown of a pair of plates 35 and 36 which are bolted as indicated at 37 to a spacing block 38 bolted as indicated at 39 to the top wall 21 of the frame.

The pipe 10 is inserted with its end in the throat between the dies and by operation of the die 26 the tongues 11 are cut one by one and bent up against a fixed block 41 (see Figs. 3, 4 and 5), and after each tongue is cut the pipe is turned or fed around and indexed, by means to be described, for cutting the next tongue, and in order to permit the turn or feed of the pipe 10 and to allow the tongue to pass or clear the fixed die member 36 said member is recessed or cut away slightly, as indicated at 40.

It may be explained that the tongue cutting and bending action indicated occurs during the first part of the turn of the crank, after which continued turn of the crank feeds the work around for the next cut. During the operations the end of the pipe between the dies is supported by a front guide or bracket 42 and a rear guide or bracket 43, the latter having a projecting horn or guide finger 44 extending to proximity with the die. These guides are vertically adjustable as by bolts 45 and slots 46 to suit the size or diameter of the pipe being cut.

The feeding and indexing mechanism will now be described. The cam 25 carries, at its exposed side, a roller 50 held by a screw 51, and as the crank is turned, after the cutting operation, this roller engages in a notch 52 in a sliding block 53 which is dovetailed into a guide 54 in the bottom plate 19 of the frame. The roller picks up the slide and advances it forwardly against the tension of a spring 55 connected to a pin 56 which works in a slot 57 in the bottom plate 19. The rear end of the slot limits the backward slide of the block so that after each operation it stops in position for the roller 50 to engage in the notch 52 and advance the slide until by continued rotation the roller 50 lifts or slips out of the notch and the spring 55 returns the block 53 to original position.

The upper left hand edge of the block 53 is provided with another notch 58 which receives a roller 59 projecting from the side of a pawl carrier 60 which is free to turn or swing on a shaft 61 the end of which has a wide bearing 62 in a bore in the end of the crank shaft 22, a spacing block 63, on the shaft 61 being interposed to properly position the parts. As the block 53 slides forwardly, or to the right in Fig. 6, it swings the pawl carrier 60 accordingly. Pivoted to the side of this carrier is a spring pawl 64 held by a spring 65 to engage one of the notches 66 in a ratchet 67 which is keyed to the shaft 61. The notches in the ratchet are spaced to form a gauge or index for each advance of the work. Splined to the shaft 61, as indicated at 68, is a pinion 69 which meshes with a pinion 70 on a stub shaft 71 which has a bearing in the side wall 20 of the frame and which also has fixed thereto a knurled feeding wheel 72 on which the pipe 10 rests during the operations, being confined thereto by a knurled wheel 73 carried in a yoke 74 at the lower end of the pin 75 and pressed down by a spring 76 in compression between the yoke and the upper arm 21 of the frame. The upper roller may be raised by a cam lever 77 pivoted at 78 to the side of the pin 75 and having a roller 79 bearing against the top surface of the arm 21 of the frame. By pressing down on the hand lever 77 the roller 73 may be lifted to permit the pipe 10 to be placed in or removed from the machine.

In operation, the roller 73 is lifted and the pipe end is threaded into the machine, with the die 26 in lower position. The crank is then turned and as it turns the cam 25 wipes upwardly and backwardly under the movable die 26, lifting the same and the cutting edges 33 and 34 of the die members cut the tongue. In the same movement the end of the die member 26 wipes up against the cut tongue 11 and bends the same to a right angle position. On continued turn of the crank the roller 50 enters the notch 52 in the slide 53 and advances said slide. This advance of the slide forwardly causes the pawl carrier 60 (by engagement of the roller 59 in the notch 58) to swing, carrying with it the pawl 64 which by its engagement in one of the notches 66 of the ratchet 67 turns said ratchet one step. The ratchet carries with it the pinion 69 which correspondingly turns the pinion 70, shaft 71 and feeding wheel 72 which by its engagement with the pipe 10 advances or turns the pipe one step forwardly, the tongue 11 passing out through the recess 40 in the die 36. Meanwhile, the roller 51 will pass out of the notch 52 thereby releasing the block 53 which is snapped back by the spring 55 and the pawl and pawl carrier slip back to engage the pawl in the next notch in the ratchet 67, for the next operation. The operation is then repeated and the next tongue is cut and bent up; and so on until completed. The roller 73 is then lifted and the pipe end drawn out after being turned slightly so that the block 41 will pass between the tongues.

It will be noted that the sequence of cutting, bending, feeding and indexing operations is automatic with the turn of the crank. This enables the work to be done quickly and uniformly and without the use of the ordinary hand tools.

Various changes may be made in the machine within the scope of the invention and no limitation in this respect is implied because of the particular form and mechanism illustrated.

I claim:

1. In a machine for cutting and bending tongues around the end of a pipe, the combination of cutting and bending die members one of which is movable, devices to feed the pipe end around step by step between the die members, means to operate the movable die member to successively cut and bend the tongues, and means to automatically operate the feeding devices after each tongue is cut and bent.

2. In a machine for cutting and bending tongues around the end of a pipe, the combination of means to turn and feed the pipe step by step, die members between which the pipe end is so fed, one of the die members being movable to cut and bend the tongues successively after each step, and means to operate the movable die member.

3. The combination stated in claim 1, the means to operate the movable die member including a rotary cam, and the means to operate the feeding devices including a pawl and ratchet mechanism operated by said cam.

4. In a machine for cutting and bending tongues around the end of a pipe, the combination of a pair of die members one of which is movable to cut and bend the tongues in succession, means to support the pipe end in position between the dies, means to reciprocate the movable die, and means to automatically turn the pipe and feed the end thereof step by step between the dies after each cutting and bending operation.

5. The combination stated in claim 4, the means to reciprocate the movable die member including a rotary shaft, and the means to operate the feeding means including a pawl and ratchet mechanism intermittently operated by said shaft and a feeding wheel engaging the pipe and operated by said mechanism.

6. In a machine for cutting and bending tongues on the edge of a sheet of metal, the combination of a female die comprising spaced plates one of which has a recess in its edge to pass the tongues when bent, a reciprocating male cutting and bending die working between said plates, means to reciprocate the male die, and means to feed the edge of the sheet transversely step by step between the dies.

7. The combination stated in claim 6, the feeding means being automatically actuated by the means to operate the movable die.

8. In a machine for cutting and bending tongues around the end of a pipe, the combination of a frame having an open side, guides for supporting a pipe end within the frame, a female die supported by the frame on the outside of the pipe end, a reciprocating male die supported by the frame on the inside of the pipe end, means carried by the frame to reciprocate the male die, and means to turn and feed the pipe end between the dies.

9. The combination stated in claim 8, the feeding means including a wheel located within the pipe end, and means to intermittently rotate said wheel.

10. The combination stated in claim 8, the means to operate the movable die including a cam shaft, and the means to feed the pipe end including a wheel engaging the pipe within the same and a pawl and ratchet mechanism between the cam shaft and said wheel, to intermittently turn the latter.

11. The combination stated in claim 8, the means to operate the movable die including a cam shaft, and the means to feed the pipe end including a wheel engaging the pipe within the same and a pawl and ratchet mechanism between the cam shaft and said wheel, to intermittently turn the latter, said pawl and ratchet mechanism being located within the pipe end when the latter is in position between the dies.

12. The combination stated in claim 2, the means to operate the movable die member including a rotary cam engaging said member, and the means to turn and feed the pipe including a sliding block, a projection carried by the cam and intermittently engaging said block, a pawl carrier operated by the block, a ratchet engaged by the pawl, and a feeding wheel driven by the ratchet and engaging the pipe.

13. In a machine for cutting and bending tongues around the end of a pipe, the combination of die members between which the pipe end is fed, one of the die members being movable, a pair of feeding wheels between which the pipe end is engaged, means to operate the movable die member to cut and bend the tongues, and means to drive one of the feeding wheels including an operating shaft, a pawl and ratchet mechanism actuated thereby, and gearing between the ratchet and said driven feeding wheel.

14. In a machine for cutting and bending tongues around the end of a pipe, the combination of a frame, fixed and movable die members therein, and between which the pipe end is placed, a crank shaft supported by the frame and provided with a cam to advance the movable die member, and means actuated by the crank shaft to feed the pipe end step by step around between the die members.

15. The combination stated in claim 14, the feeding means including a projection carried by the cam, a reciprocating block engaged by said projection during part of each rotation of the cam, a pawl and ratchet mechanism operated by the reciprocating block, and a feeding wheel engaging the pipe and driven by the pawl and ratchet mechanism.

HAROLD VINCENT DUNN.